United States Patent
Kim et al.

(10) Patent No.: US 9,784,833 B2
(45) Date of Patent: Oct. 10, 2017

(54) PARKING ASSISTANCE FOR A VEHICLE

(71) Applicant: LG ELECTRONICS INC., Seoul (KR)

(72) Inventors: Sungmin Kim, Seoul (KR); Byeongrim Jo, Seoul (KR); Juhnho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/863,240

(22) Filed: Sep. 23, 2015

(65) Prior Publication Data
US 2016/0084958 A1    Mar. 24, 2016

(30) Foreign Application Priority Data

Sep. 24, 2014 (KR) .................. 10-2014-0127658

(51) Int. Cl.
*G01S 15/93* (2006.01)
*G01S 15/10* (2006.01)
*G01S 7/521* (2006.01)
*G01S 15/02* (2006.01)
*G01S 7/534* (2006.01)
*G01S 15/32* (2006.01)
*G01S 15/87* (2006.01)

(52) U.S. Cl.
CPC .......... *G01S 15/931* (2013.01); *G01S 7/521* (2013.01); *G01S 7/534* (2013.01); *G01S 15/025* (2013.01); *G01S 15/102* (2013.01); *G01S 15/32* (2013.01); *G01S 15/87* (2013.01); *G01S 2015/933* (2013.01); *G01S 2015/936* (2013.01); *G01S 2015/938* (2013.01)

(58) Field of Classification Search
CPC ...... G01S 15/931; G01S 15/102; G01S 15/87; G01S 15/32; G01S 2015/932
See application file for complete search history.

(56) References Cited

U.S. PATENT DOCUMENTS 5,241,360 A * 8/1993 Key .................. G01S 17/36
356/5.12
2004/0094711 A1 5/2004 Lee et al.
(Continued)

FOREIGN PATENT DOCUMENTS

KR    10-2004-042420 A    5/2004

OTHER PUBLICATIONS

Korean Notice Allowance dated Apr. 8, 2015, for Korean Application No. 10-2014-0127658, 2 pages.

Primary Examiner — Hongmin Fan
(74) Attorney, Agent, or Firm — Fish & Richardson P.C.

(57) ABSTRACT

Systems and techniques are described that provide automated parking assistance for a vehicle. In some implementations, a parking assistance apparatus includes a frequency generator configured to generate a first frequency and a second frequency, and generate at least one synthesized frequency that is synthesized from the first frequency and the second frequency. The apparatus also includes a piezoelectric converter configured to, using piezoelectric effects, transmit ultrasonic waves having the at least one synthesized frequency, and receive reflected ultrasonic waves that result from the transmitted ultrasonic waves being reflected by an object. The apparatus also includes a filter unit configured to detect a predetermined frequency from the reflected ultrasonic waves.

19 Claims, 16 Drawing Sheets

(56) References Cited

U.S. PATENT DOCUMENTS

| | | | |
|---|---|---|---|
| 2005/0088290 A1* | 4/2005 | Hayashi | B60R 11/02 340/429 |
| 2010/0220551 A1* | 9/2010 | Akiyama | G01S 7/52003 367/99 |
| 2013/0329523 A1* | 12/2013 | Karl | G01S 7/5276 367/99 |

* cited by examiner

PARKING ASSISTANCE FOR A VEHICLE

CROSS-REFERENCE TO RELATED APPLICATION

Pursuant to 35 U.S.C. §119(a), this application claims the benefit of an earlier filing date and right of priority to Korean Patent Application No. 10-2014-0127658, filed on Sep. 24, 2014 in the Korean Intellectual Property Office, the disclosure of which is incorporated herein by reference.

TECHNICAL FIELD

The present application relates to automated parking assistance for a vehicle.

BACKGROUND

Vehicles provide increased functionality designed to help drivers operate the vehicles. Some vehicles include a parking assistance functions that helps drivers during parking of the vehicle. Such parking assistance functions include notifying drivers of objects that are in a vicinity of the vehicle as well as more complex operations of automated parking of the vehicle.

SUMMARY

Systems and techniques are disclosed that provide automated parking assistance for a vehicle based on sensing objects in a near field and a far field of the vehicle.

In one aspect, a parking assistance apparatus may include a frequency generator configured to generate a first frequency and a second frequency; and generate at least one synthesized frequency that is synthesized from the first frequency and the second frequency. The apparatus may also include a piezoelectric converter configured to, using piezoelectric effects transmit ultrasonic waves having the at least one synthesized frequency; and receive reflected ultrasonic waves that result from the transmitted ultrasonic waves being reflected by an object. The apparatus may further include a filter unit configured to detect a predetermined frequency from the reflected ultrasonic waves.

In another aspect, a parking assistance apparatus may include a frequency generator configured to generate a first frequency and a second frequency; and generate at least one synthesized frequency that is synthesized from the first frequency and the second frequency. The apparatus may also include a piezoelectric converter configured to, using piezoelectric effects, transmit ultrasonic waves having the at least one synthesized frequency. The apparatus may further include a microphone configured to receive reflected ultrasonic waves that result from the transmitted ultrasonic waves being reflected by an object. The apparatus may additionally include a filter unit configured to detect a predetermined frequency from the reflected ultrasonic waves.

Implementations may include one or more of the following features. For example, the piezoelectric converter may be configured to transmit the ultrasonic waves and to receive the reflected ultrasonic waves based on time sharing between a transmission state and a reception state.

In some examples, the filter unit may include a band pass filter.

In some examples, the filter unit may include a band pass filter.

In some examples, the parking assistance apparatus may further include a diffuser configured to diffuse the ultrasonic waves over at least a predetermined range of diffusion.

In some examples, the parking assistance apparatus may further include a diffuser configured to diffuse the ultrasonic waves over at least a predetermined range of diffusion.

In some examples, the at least one synthesized frequency may include a third frequency and a fourth frequency, and the filter unit may include a first filter configured to detect the third frequency from the reflected ultrasonic waves; and a second filter configured to detect the fourth frequency from the reflected ultrasonic waves. The parking assistance apparatus may be further configured to detect an object in a near field based on the detected third frequency; and detect an object in a far field based on the detected fourth frequency.

In some examples, the at least one synthesized frequency may include a third frequency and a fourth frequency, and the filter unit may include a first filter configured to detect the third frequency from the reflected ultrasonic waves; and a second filter configured to detect the fourth frequency from the reflected ultrasonic waves. The parking assistance apparatus may be further configured to detect an object in a near field based on the detected third frequency; and detect an object in a far field based on the detected fourth frequency.

In another aspect, a parking assistance apparatus may include a first piezoelectric converter configured to, using piezoelectric effects, generate first ultrasonic waves having a first frequency. The apparatus may also include a second piezoelectric converter configured to, using piezoelectric effects, generate second ultrasonic waves having a second frequency. The apparatus may further include a microphone configured to receive reflected ultrasonic waves that result from reflections, by an object, of synthesized ultrasonic waves that are synthesized from the first ultrasonic waves and the second ultrasonic waves. The apparatus may additionally include a first filter configured to filter a third frequency from the reflected ultrasonic waves; and a second filter configured to filter a fourth frequency from the reflected ultrasonic waves. The parking assistance apparatus may be configured to detect an object in a near field based on the detected third frequency; and detect an object in a far field based on the detected fourth frequency.

In some examples, the first and second filters may include band pass filters.

In some examples, the parking assistance apparatus may further include a diffuser configured to diffuse the first and second ultrasonic waves over at least a predetermined range of diffusion.

In some examples, the parking assistance apparatus may further include a steering wheel drive unit configured to change a travelling direction of a vehicle by moving at least one wheel of the vehicle. The apparatus may further include a controller configured to determine whether or not an object is sensed based on the detected third frequency and the detected fourth frequency during a parking operation of the vehicle; and control the steering wheel drive unit based on a determination of whether or not the object is sensed.

In some examples, the parking assistance apparatus may further include a brake drive unit configured to control operation of a brake connected to at least one wheel of the vehicle. The apparatus may also include a power source drive unit configured to control operation of a power source of the vehicle. The apparatus may further include a controller configured to determine whether or not an object is sensed based on the third frequency and the fourth frequency during a parking operation of the vehicle; and control the brake drive unit and the power source drive unit of the vehicle based on a determination of whether or not the object is sensed.

In some examples, the parking assistance apparatus may further include a speed sensing unit configured to sense a traveling speed of a vehicle. The apparatus may also include a controller configured to determine whether or not an object is sensed based on the third frequency and the fourth frequency; and determine an available parking space based on a period of time during which the object is not sensed and based on the traveling speed of the vehicle sensed by the speed sensing unit.

In some examples, the parking assistance apparatus may further include a memory configured to store information regarding a width and a length of a body of the vehicle. The controller may be further configured to determine a width and a length of the available parking space; perform a first comparison between the width of the body of the vehicle and the width of the available parking space; perform a second comparison between the length of the body of the vehicle and the length of the available parking space; and determine a parking method for the vehicle based on the first comparison and the second comparison.

In some examples, the controller may be configured to determine a physical dimension of the sensed object based on a period of time during which the object is sensed and based on the traveling speed of the vehicle sensed by the speed sensing unit; and determine a parking method of the vehicle based on the determined physical dimension of the sensed object.

In another aspect, a vehicle may include a parking assistance apparatus according to one or more of the examples described above.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Systems and techniques are disclosed that enable a parking assistance apparatus which includes an ultrasonic sensor configured to sense objects in a near field and a far field of a vehicle.

In general, a parking assistance apparatus refers to an apparatus that is able to sense an obstacle around a vehicle. The parking assistance apparatus may notify a driver of a distance between the obstacle and a vehicle, for example, during parking the vehicle, or may automatically perform parking of the vehicle based on the sensed obstacle. The parking assistance apparatus may include an ultrasonic sensor to sense an obstacle.

An ultrasonic sensor typically operates based on the principle of echo sounding. The ultrasonic sensor includes a transmitting/receiving unit that transmits ultrasonic waves and receives reflected waves from an object. Based on analyzing the reflected waves, an ultrasonic sensor may be used to monitor a distance to an obstacle and a space in which the obstacle is present.

The distance at which ultrasonic waves can be used to sense objects is typically limited. As an example, for ultrasonic sensors that utilize a frequency band of 40~50 kHz, the attenuation of the propagating waves may limit the distance at which ultrasonic waves can be effectively used to detect objects to at most a few meters (e.g., approximately 3 meters). In such cases, the distance at which ultrasonic waves can be used to sense objects may be insufficient to detect whether an obstacle is present in a parking space, for example during perpendicular parking of a vehicle.

Techniques disclosed herein enable a parking assistance apparatus to provide a longer distance at which ultrasonic waves may be used to detect objects. Such techniques may provide numerous advantages in certain scenarios, for example, with the ability to detect an obstacle even in the case of perpendicular parking as well as parallel parking of a vehicle.

In some implementations, the parking assistance apparatus may generate ultrasonic waves having a plurality of frequencies, and receive reflections of the ultrasonic waves that are reflected by an object. The parking assistance apparatus may detect, from the reflected ultrasonic waves, one or more frequencies that it uses to detect an object in a near field or a far field. In some implementations, the detected one or more frequencies that are used to detect an object in a near field or a far field may be synthesized from other frequencies generated by the parking assistance apparatus A vehicle as described in this specification may include any suitable vehicle, such as a car or a motorcycle. Hereinafter, a description will be given based on a car.

Figure 1:
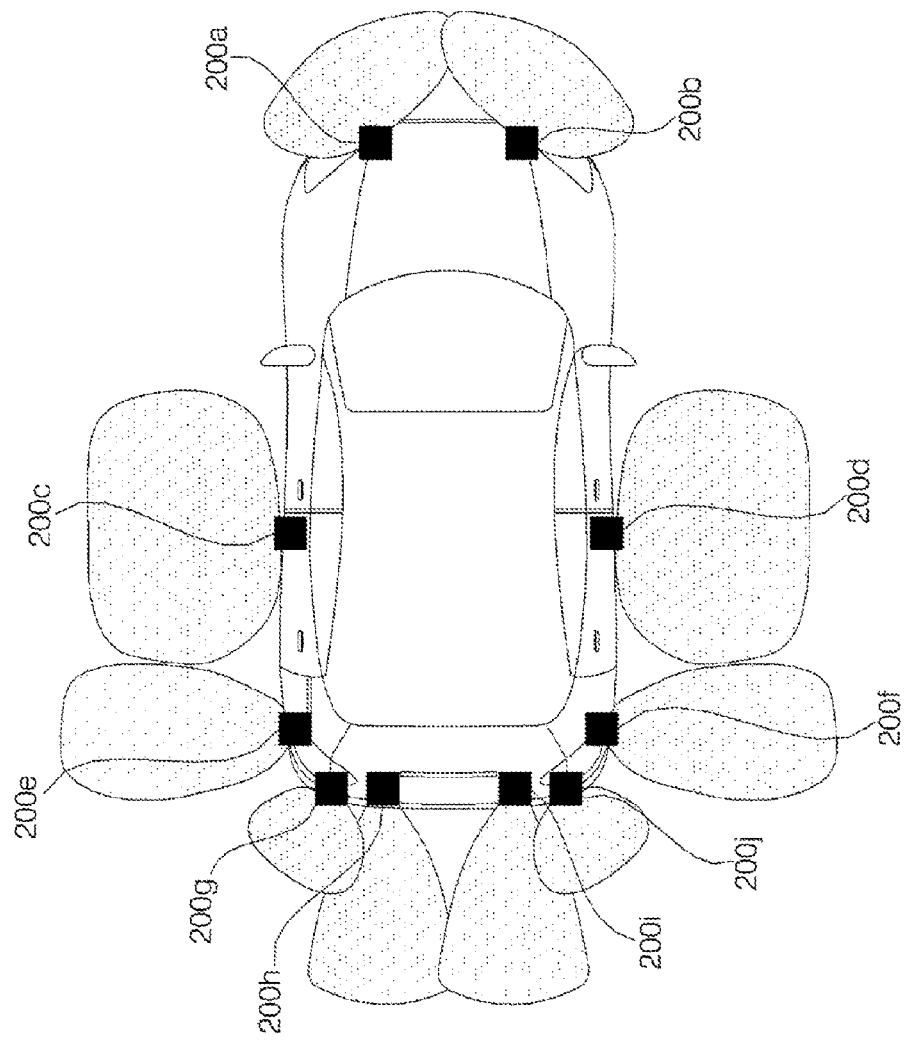
FIG. 1 is a diagram illustrating an example of ultrasonic sensors and a vehicle including the ultrasonic sensors.

FIG. 1 is a view referenced to illustrate ultrasonic sensors and a vehicle including the ultrasonic sensors.

Referring to FIG. 1, the vehicle 10 may be a concept including a vehicle equipped with an internal combustion engine, a hybrid vehicle equipped with both an internal combustion engine and an electric motor, and an electric vehicle equipped with an electric motor.

The vehicle 10 includes various sensors. For example, the vehicle 10 may include at least one of an illuminance sensor, an acceleration sensor, a gravity sensor, a gyroscope sensor, a motion sensor, an infrared sensor, an ultrasonic sensor, an optical sensor, a microphone, a battery gauge, an environmental sensor (for example, a barometer, a hygrometer, a thermometer, a thermal sensor, and a gas sensor). The vehicle 10 disclosed in this specification may combine and utilize pieces of information acquired from at least two sensors among the aforementioned sensors.

Among various sensors included in the vehicle 10, ultrasonic sensors 200a to 200j may be arranged at the front, rear, and lateral sides of the vehicle 10 and serve to sense an object located in proximity to the vehicle 10. The ultrasonic sensors 200a to 200j may be used in a parking assistance apparatus. For example, when a driver parks the vehicle 10, the ultrasonic sensors 200a to 200j may be used in the parking assistance apparatus to output an alarm upon sensing an obstacle around the vehicle 10. Alternatively, in the case of an automated parking system, the ultrasonic sensors 200a to 200j enable steering of the vehicle 10 via control of a steering wheel, stop of the vehicle 10 via control of a brake drive unit, or movement of the vehicle 10 via control of a power source drive unit, upon sensing an obstacle around the vehicle 10.

In some cases, the ultrasonic sensors 200a to 200j may be simpler and/or less expensive to implement as compared to other types of object detection sensors. However, the ultrasonic sensors 200a to 200j may be limited in functionality, for example they may be suitable for detection of a near object, but may not be suitable for detection of middle distance and far-distance objects. In general, a sensible distance of ultrasonic waves by the ultrasonic sensors equipped in the vehicle 10 is within 3 m.

Far-field detection may be used in numerous scenarios. For example, far-field detection may be used in some parking situations. A parking space in which one vehicle can be parked typically has a width of about 2.3 m and a length of about 5 m. Thus, in the case of perpendicular parking (forward parking, backward parking, or T-shaped parking), for example, an ultrasonic sensor having a sensible range of at least 5 m or more may be used to sense an object located in the longitudinal direction of the parking space. Far-field detection may also be used in other scenarios as well, and are not limited to perpendicular parking.

Figure 2A:
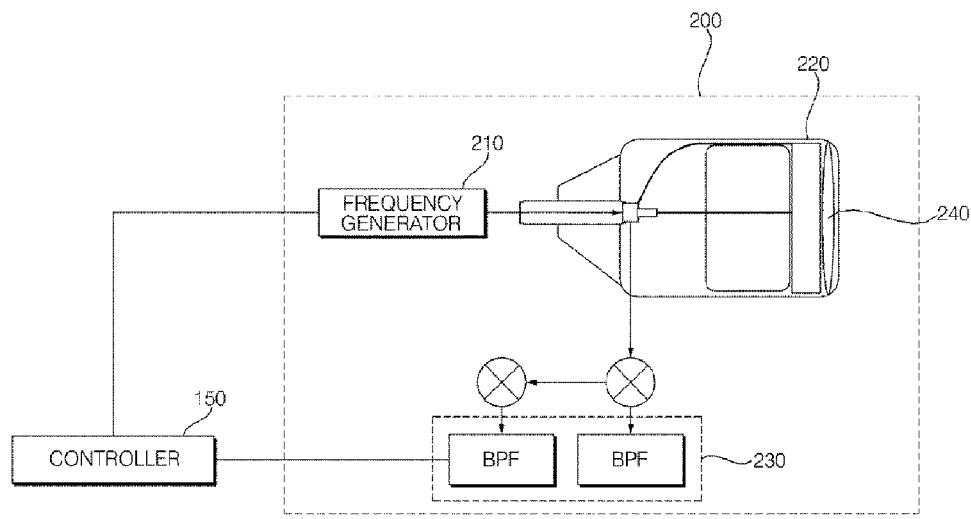
FIG. 2A is a diagram illustrating an example of an ultrasonic sensor according to a first implementation.
Figure 2B:
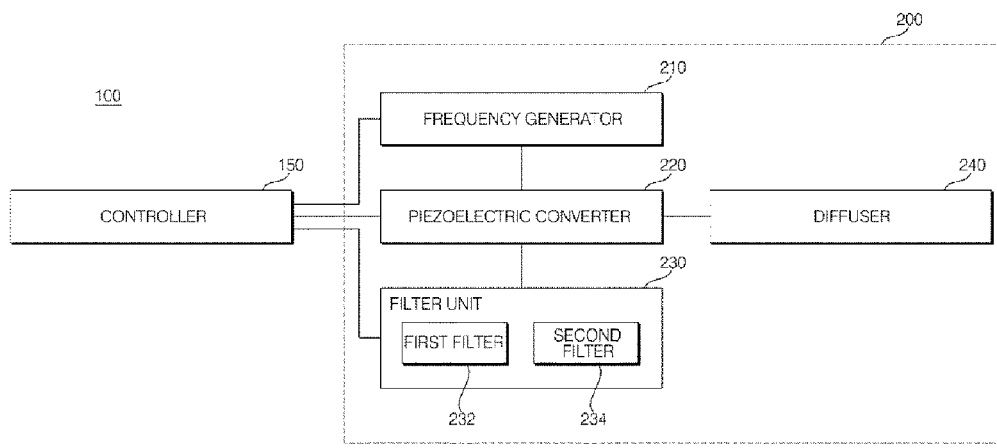
FIG. 2B is a diagram illustrating an example of an ultrasonic sensor according to the first implementation.

FIG. 2A is diagram illustrating an example of an ultrasonic sensor according to a first implementation, and FIG. 2B is a block diagram illustrating an example of an ultrasonic sensor according to the first implementation.

Referring to the examples in FIGS. 2A and 2B, the ultrasonic sensor 200 according to the first implementation may include a frequency generator 210, a piezoelectric converter 220, a filter unit 230, and a diffuser 240.

The frequency generator 210 outputs multiple frequencies by generating a first frequency and a second frequency. In some implementations, frequencies in addition to the first and second frequencies may be generated as a result of being synthesized from the first and second frequencies. For example, a third frequency and a fourth frequency may be generated by the frequency generator 210 based on a synthesis of the first and second frequencies. The third frequency may be generated as a high-frequency synthesized frequency based on the first and second frequencies. The fourth frequency may be generated as a low-frequency synthesized frequency based on the first and second frequencies. The resulting high-frequency component may be used to detect near-field objects, and the low-frequency component may be used to detect far-field objects.

In some implementations, the system may be able to generate both a synthesized high-frequency component and a synthesized low-frequency component based on first and second frequencies of relatively similar frequencies. For example, the third and fourth frequencies may be generated as a result of harmonic interference that occurs between the first and second frequencies. In general, by generating a first frequency and a second frequency, the frequency generator 210 may also generate an additional high-frequency third component and a low-frequency fourth component as a result of synthesizing the first and second frequencies. This may enable reducing costs and number of components in generating high and low-frequency components. The process in which these different frequencies are synthesized is described in further detail with reference to FIG. 5B, below.

A conventional ultrasonic sensor generates and transmits ultrasonic waves having a single frequency. In addition, the conventional ultrasonic sensor may receive echo ultrasonic waves as the transmitted ultrasonic waves are reflected by an object. In general, the frequency of ultrasonic waves transmitted through the ultrasonic wafer equipped in the vehicle 10 is within a range of 40~50 kHz. The conventional ultrasonic sensor typically cannot detect an object located in a far field due to attenuation of a frequency depending on a propagation distance.

However, the ultrasonic sensor 200 according to some implementations is configured to transmit ultrasonic waves having different multiple frequencies. For example, in some implementations, the ultrasonic sensor 200 may generate at least four different frequencies. In such scenarios, a first frequency and a second frequency may be generated by a frequency generator, and a third frequency and a fourth frequency may also be generated based on synthesizing the first and second frequencies. Waves of all four frequencies may be transmitted by the ultrasonic sensor 200 and propagate towards an object and reflect back to the vehicle.

The ultrasonic sensor 200 then receives echo ultrasonic waves of the multiple frequencies as the transmitted ultrasonic waves are reflected by an object. The ultrasonic sensor 200 senses the object by filtering the third frequency and the fourth frequency from the received echo ultrasonic waves. The third frequency may be, for example, a high frequency that is able to detect near-field objects. The fourth frequency may be, for example, a low frequency that can reach a far field that corresponds to a relatively remote distance with less dissipation thereof and, therefore, can detect an object located at a middle distance or remote distance.

The piezoelectric converter 220 may include a piezoelectric element, a transmitter, and a receiver. The piezoelectric converter 220 generates ultrasonic waves having the synthesized frequencies output by the frequency generator 210 using the piezoelectric element. In some implementations, the piezoelectric converter 220 may utilize piezoelectric effects. The piezoelectric converter 220 transmits the generated ultrasonic waves through the transmitter.

The piezoelectric converter 220 may receive echo ultrasonic waves reflected by the object through the receiver.

As described above, the piezoelectric converter 220 may serve not only to transmit ultrasonic waves, but also to receive echo ultrasonic waves. For example, the piezoelectric converter 220 may transmit ultrasonic waves or receive echo ultrasonic waves based on time sharing. For example, the piezoelectric converter 220 may transmit ultrasonic waves for a time from 0 to t1 and receive echo ultrasonic waves for a time from t1 to t2. Subsequently, the piezoelectric converter 220 may transmit ultrasonic waves for a time from t3 to t4 and receive echo ultrasonic waves for a time from t4 to t5. The piezoelectric converter 220 may repeatedly perform this procedure.

The piezoelectric element may be a functional ceramic having a direct piezoelectric effect to convert mechanical energy into electrical energy and a converse piezoelectric effect to convert electrical energy into mechanical energy.

The direct piezoelectric effect refers to a phenomenon in which an electric signal is generated at an output terminal of a piezoelectric element when, for example, external stress or vibration displacement is applied to the piezoelectric element via a voltage generation function. The direct piezoelectric effect is applied to a piezoelectric element for ignition or various sensors. The converse piezoelectric effect refers to a phenomenon in which a voltage is applied from an external source to a piezoelectric element via a displacement generation function to allow the piezoelectric element to cause mechanical displacement. The converse piezoelectric effect is mainly applied to, for example, an actuator.

The piezoelectric converter 220 may generate ultrasonic waves using the converse piezoelectric effect of the piezoelectric element. In addition, the piezoelectric converter 220 may receive echo ultrasonic waves reflected by an object using the piezoelectric effects of the piezoelectric element.

The filter unit 230 detects a predetermined frequency from received echo ultrasonic waves. For example, the filter unit 230 may be configured as at least one band pass filter.

The filter unit 230 may include a first filter 232 and a second filter 234. Echo ultrasonic waves as reflected ultrasonic waves having synthesized frequencies from an object includes the third frequency and the fourth frequency in the same manner as the synthesized frequencies.

The first filter 232 detects the third frequency. The magnitude of the third frequency corresponds to the arithmetic mean of the magnitude of the first frequency and the magnitude of the second frequency. For example, if the first frequency is f1 and the second frequency is f2, the third frequency corresponds to (f1+f2)/2. Thus, the third frequency may be used to sense an object in a near field in the same manner as the conventional ultrasonic sensor. In some implementations, the near field may mean a distance at which an object can be sensed via ultrasonic waves according to single-frequency ultrasonic sensors. For example, the near field may mean a distance equal to or less than the full width of the vehicle equipped with the parking assistance apparatus from the ultrasonic sensor 200. In some implementations, the near field may mean a distance less than a few meters from the ultrasonic sensor 200. For example, the near field may mean a distance within 3 m from the ultrasonic sensor 200. As another example, the near field may mean a distance within 10 m from the ultrasonic sensor 200. In general, the third frequency may be a frequency that may be used to sense an object at a distance equal to or less than the full width of the vehicle equipped with the parking assistance apparatus, and may thus be referred to as a "near field frequency" in the present disclosure.

The second filter 234 detects the fourth frequency. The magnitude of the fourth frequency corresponds to a difference between the magnitude of the first frequency and the magnitude of the second frequency. For example, if the first frequency is f1 and the second frequency is f2, the fourth frequency corresponds to |f1−f2|. The fourth frequency may be used to sense an object in a far field because it corresponds to a low frequency and may have substantially no attenuation depending on a propagation distance. In some implementations, the far field may mean a distance that is further than a distance at which an object can be sensed by single-frequency ultrasonic sensors. As an example, the far field may mean a distance equal to or greater than the full width of the vehicle equipped with the parking assistance apparatus from the ultrasonic sensor 200. In some implementations, the far field may mean a distance that is greater than a few meters from the ultrasonic sensor 200. For example, the far field may mean a distance from 3 m to 10 m from the ultrasonic sensor 200. As another example, the far field may mean a distance greater than 10 m from the ultrasonic sensor 200. In general, the fourth frequency may be a frequency that can be used to sense an object at a distance equal to or greater than the full width of the vehicle equipped with the parking assistance apparatus, and thus may be referred to as a "far field frequency" in the present disclosure.

The diffuser 240 may include an acoustic lens. The diffuser 240 may diffuse ultrasonic waves emitted through the acoustic lens by a predetermined angle. The diffuser 240 may allow other vehicles around the vehicle equipped with the parking assistance apparatus to be sensed by diffusing the ultrasonic waves by the predetermined angle.

A controller 150 is provided to control an operation of the ultrasonic sensor 200. The controller 150 transmits and receives data including control signals to and from the frequency generator 210, the piezoelectric converter 220, and the filter unit 230.

Figure 3A:
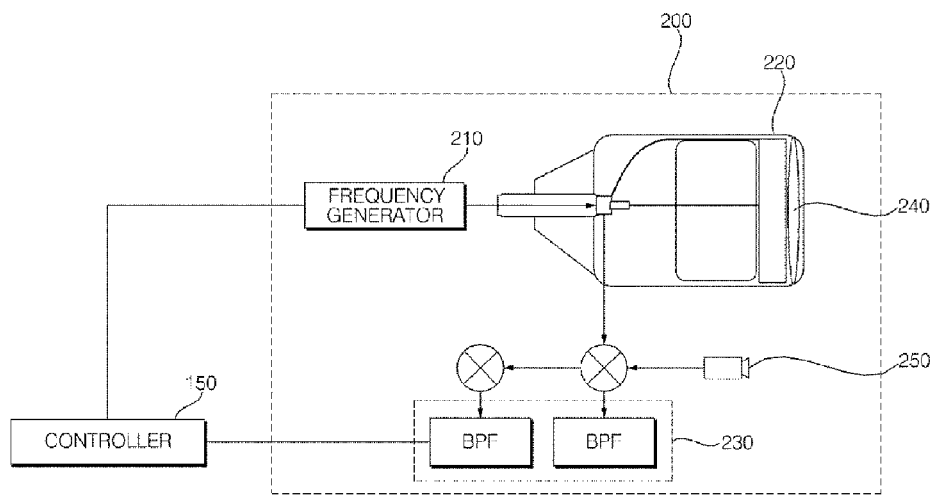
FIG. 3A is diagram illustrating an example of an ultrasonic sensor according to a second implementation.
Figure 3B:
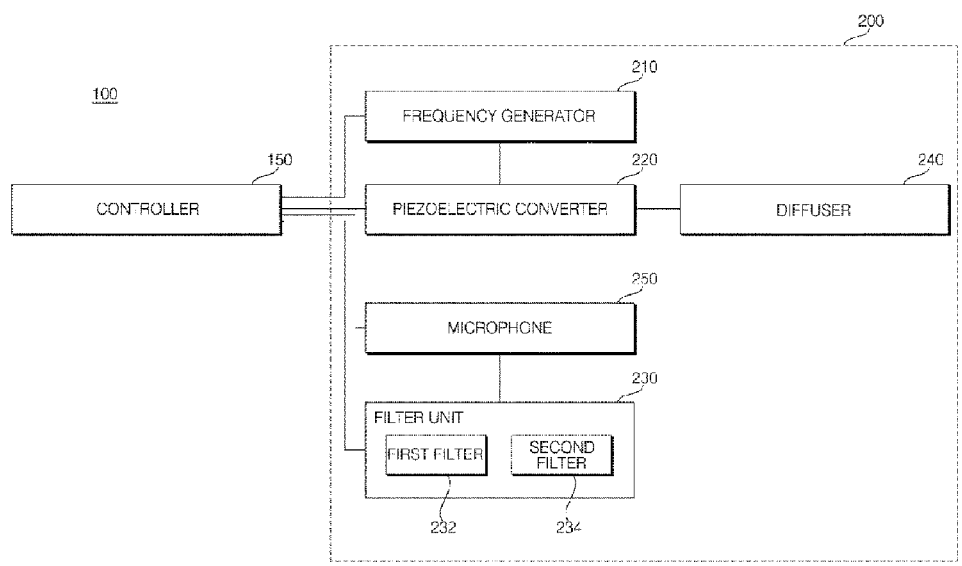
FIG. 3B is a diagram illustrating an example of an ultrasonic sensor according to the second implementation.

FIG. 3A is a diagram illustrating an example of an ultrasonic sensor according to a second implementation and FIG. 3B is a block diagram illustrating an example of an ultrasonic sensor according to the second implementation.

Referring to the examples in FIGS. 3A and 3B, the ultrasonic sensor 200 according to the second implementation may include a frequency generator 210, a piezoelectric converter 220, a filter unit 230, a diffuser 240 and a microphone 250.

A description of the second implementation will be centered on the piezoelectric converter 220 and the microphone 250 that are different from those of the first implementation.

The frequency generator 210 generates a synthesized frequency by synthesizing a first frequency and a second frequency.

The piezoelectric converter 220 may include a piezoelectric element and a transmitter. The piezoelectric element 220 generates ultrasonic waves having the synthesized frequency generated by the frequency generator 210 using the piezoelectric element. The piezoelectric converter 220 transmits the generated ultrasonic waves through the transmitter. At this time, the piezoelectric converter 220 may utilize piezoelectric effects.

The microphone 250 receives echo ultrasonic waves as the ultrasonic waves transmitted from the piezoelectric converter 220 are reflected by an object. The microphone 250 may include a receiver capable of receiving echo ultrasonic waves. The microphone 250 may include an amplifier to amplify echo ultrasonic waves and a signal processor to extract only a required signal.

The microphone 250 transmits the received echo ultrasonic waves to the filter unit 230.

The filter unit 230 detects a predetermined frequency from the echo ultrasonic waves. As described above in the first implementation, the filter unit 230 includes a first filter to detect a third frequency for detection of an object in a near field from the echo ultrasonic waves and a second filter to detect a fourth frequency for detection of an object in a far field from the echo ultrasonic waves.

The diffuser 240 may include an acoustic lens. The diffuser 240 may diffuse ultrasonic waves emitted through the acoustic lens by a predetermined angle. The diffuser 240 may sense other vehicles around the vehicle equipped with the parking assistance apparatus by diffusing the ultrasonic waves by the predetermined angle.

Figure 4A:
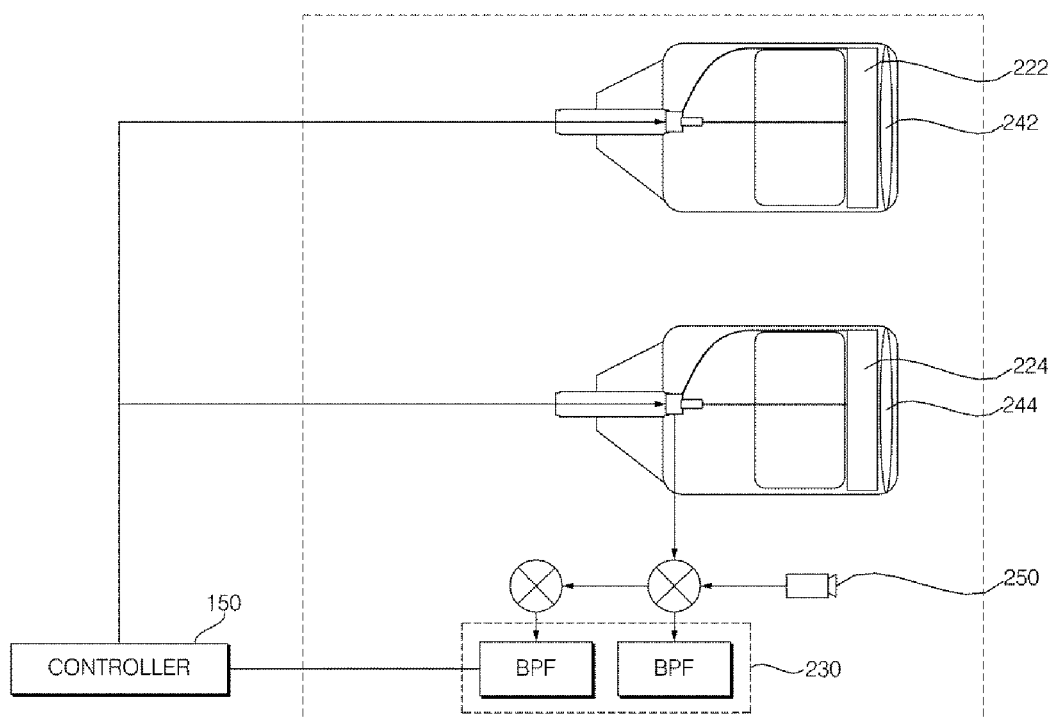
FIG. 4A is a diagram illustrating an example of an ultrasonic sensor according to a third implementation.
Figure 4B:
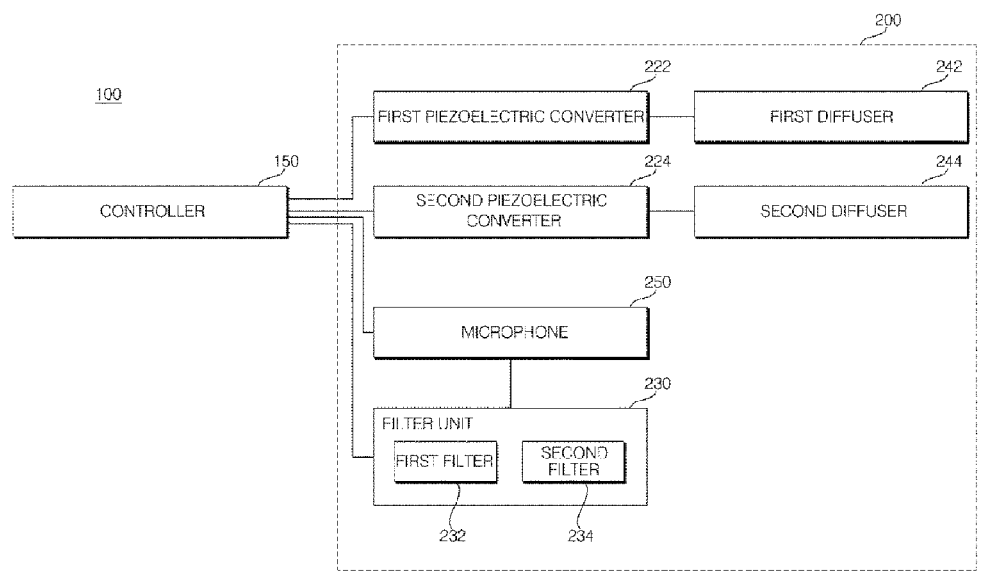
FIG. 4B is a block diagram illustrating an example of an ultrasonic sensor according to the third implementation.

FIG. 4A is a diagram illustrating an example of an ultrasonic sensor according to a third implementation and FIG. 4B is a block diagram illustrating an example of an ultrasonic sensor according to the third implementation.

Referring to examples in FIGS. 4A and 4B, the ultrasonic sensor 200 according to the third implementation may include a first piezoelectric converter 222, a second piezoelectric converter 224, a filter unit 230, a first diffuser 242, a second diffuser 244, and a microphone 250.

The first piezoelectric converter 222 may include a piezoelectric element and a transmitter. The first piezoelectric converter 222 generates ultrasonic waves having a first frequency using the piezoelectric element. For example, the first piezoelectric converter 222 may utilize piezoelectric effects. The first piezoelectric converter 222 transmits the generated ultrasonic waves through the transmitter.

The second piezoelectric converter 224 may include a piezoelectric element and a transmitter. The second piezoelectric converter 224 generates ultrasonic waves having a second frequency using the piezoelectric element. For example, the second piezoelectric converter 224 may utilize piezoelectric effects. The second piezoelectric converter 224 transmits the generated ultrasonic waves through the transmitter.

The resulting first and second frequencies of the generated ultrasonic waves may then be synthesized to generated synthesized frequencies. For example, a third frequency and a fourth frequency may be synthesized from the first and second frequencies. In some implementations, the synthesis of the third and fourth frequencies may be generated by harmonic interference between the first and second frequencies. In general, by generating ultrasonic waves having first and second frequencies using the first and second piezoelectric converters 222 and 224, the ultrasonic sensor 200 may generate one or more additional synthesized frequencies that are synthesized from the first and second frequencies.

Ultrasonic waves having an aggregate of the first, second, and additional synthesized frequencies may propagate from the ultrasonic sensor 200 to an object and be reflected back to the ultrasonic sensor 200.

The microphone 250 receives echo ultrasonic waves as the synthesized ultrasonic waves are reflected by an object. In this example, the synthesized ultrasonic waves are acquired by synthesizing the first ultrasonic waves transmitted from the first piezoelectric converter 222 and the second ultrasonic waves transmitted from the second piezoelectric converter 224. The microphone 250 may include a receiver capable of receiving echo ultrasonic waves. The microphone 250 may include an amplifier to amplify echo ultrasonic waves and a signal processor to extract only a required signal.

The filter unit 230 detects a predetermined frequency from the echo ultrasonic waves. As described above in the first implementation, the filter unit 230 includes a first filter to detect a third frequency for detection of an object in a near field from the echo ultrasonic waves and a second filter to detect a fourth frequency for detection of an object in a far field from the echo ultrasonic waves.

The first diffuser 242 may include an acoustic lens. The first diffuser 242 may diffuse the first ultrasonic waves transmitted from the first piezoelectric converter 222 by a predetermined angle through the acoustic lens. The first diffuser 242 may allow other vehicles around the vehicle equipped with the parking assistance apparatus to be sensed by diffusing the ultrasonic waves by the predetermined angle.

The second diffuser 244 may include an acoustic lens. The second diffuser 244 may diffuse the second ultrasonic waves transmitted from the second piezoelectric converter 224 by a predetermined angle through the acoustic lens. The second diffuser 244 may allow other vehicles around the vehicle equipped with the parking assistance apparatus to be sensed by diffusing the ultrasonic waves by the predetermined angle.

Figure 5A:
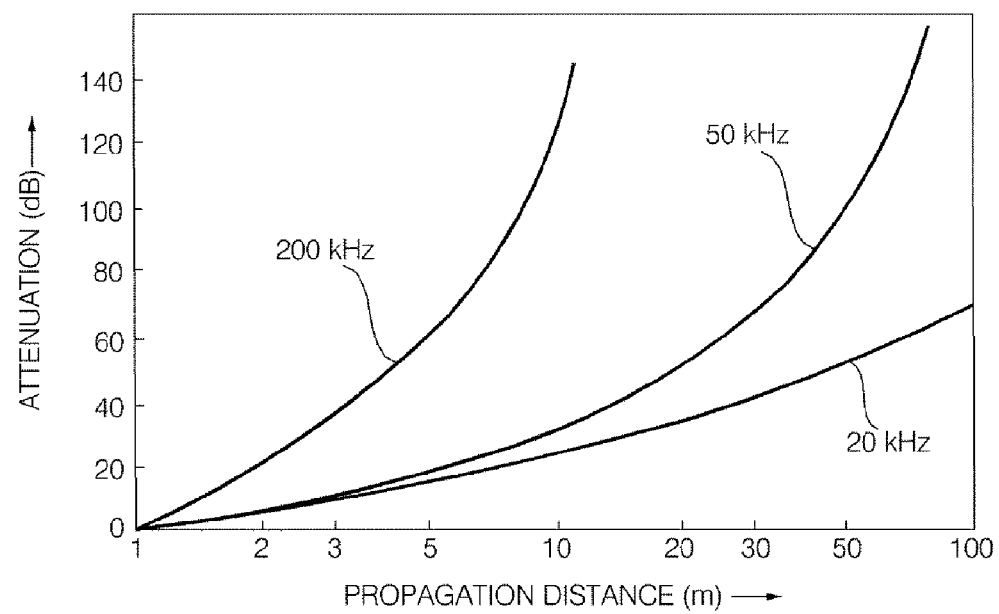
FIGS. 5A to 5C are diagrams illustrating examples of generating a synthesized frequency from a first frequency and a second frequency.
Figure 5B:
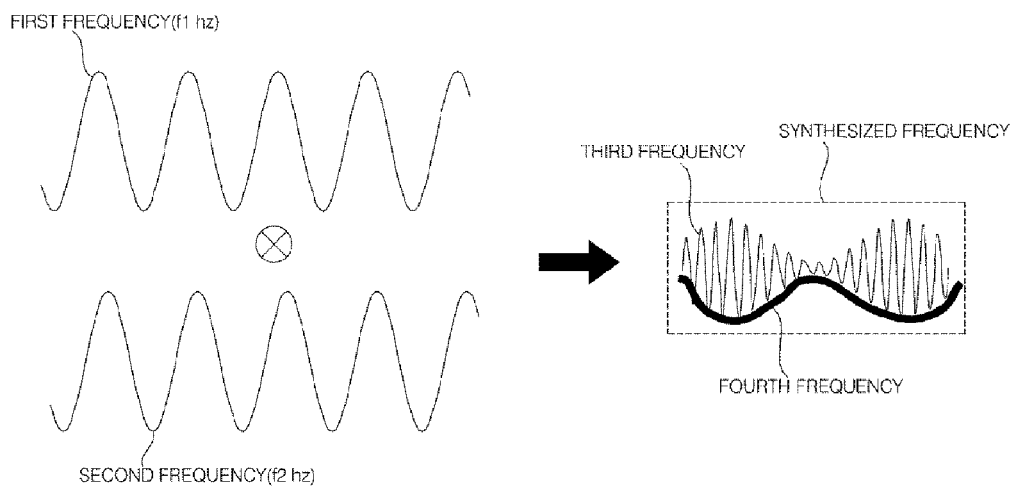
Figure 5C:
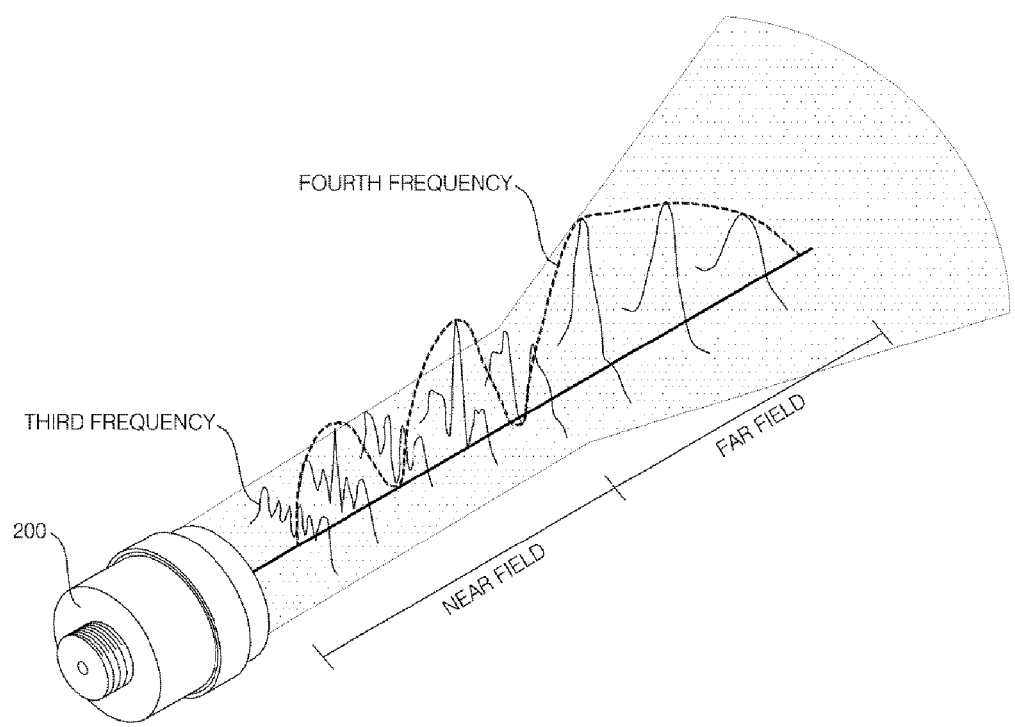

FIGS. 5A to 5C are diagrams illustrating examples of a synthesized frequency that is generated based on a first frequency and a second frequency.

FIG. 5A is a graph illustrating attenuation of a frequency depending on a propagation distance on a per frequency basis.

Referring to FIG. 5A, all of frequencies of 20 kHz, 50 kHz and 200 kHz exhibit increasing attenuation as a propagation distance increases. In particular, increase in the attenuation of a frequency depending on a propagation distance becomes steeper as the magnitude of a frequency increases. For example, the frequency of 20 kHz exhibits attenuation of about 20 dB at a propagation distance of 5 m, whereas the frequency of 200 kHz exhibits attenuation of about 60 dB at a propagation distance of 5 m.

The conventional ultrasonic sensor uses a frequency in a band of 40~50 kHz. As can be seen in FIG. 5A, the attenuation of a frequency rapidly increases at a distance of 3 m or more, which is not suitable for detection of an object in a far field.

FIG. 5B is a diagram illustrating an example of a generating a synthesized frequency from a first frequency and a second frequency.

As illustrated in the left side of FIG. 5B, it is assumed that a first frequency in the band of f1 [Hz] and a second frequency in the band of f2 [Hz] have values close to each other. Based on the first frequency and the second frequency, additional one or more frequencies having a different frequency than the first frequency and the second frequency may be generated. For example, as illustrated in the right side of FIG. 5B, a frequency (third frequency) in the band of (f1+f2)/2 is generated via vibration at a frequency (fourth frequency) in the band of |f1−f2| corresponding to a difference between the first frequency and the second frequency. As an example, an (f1+f2)/2 frequency having an envelope frequency of |f1−f2| is generated. In some implementations, the third and fourth frequencies may be generated as a result of harmonic interference between the first and second frequencies.

For example, upon synthesizing first and second frequencies of 50,000 Hz and 50,010 Hz, an additional frequency (fourth frequency) of 50,005 Hz having an envelope frequency (third frequency) of 10 Hz may be generated.

FIG. 5C is a diagram illustrating an example of detection of objects located in a near field and a far field through the ultrasonic sensor.

As described above in the first, second, and third implementations, the ultrasonic sensor 200 according to some implementations filters the third frequency and the fourth frequency of the echo ultrasonic waves through a band pass filter.

The third frequency is a frequency having substantially the same band as the first frequency and the second frequency and, therefore, may be used to detect an object located in a near field. As illustrated in FIG. 5C, the third frequency is attenuated in a far field and not suitable for sensing an object located in the far field.

The fourth frequency is a frequency having an extremely low frequency band. Thus, the fourth frequency, as illustrated in FIG. 5A, does not exhibit rapid increase in attenuation depending on a propagation distance and, therefore, the ultrasonic sensor 200 according to some implementations may sense an object located in a far field using the fourth frequency.

Figure 6:
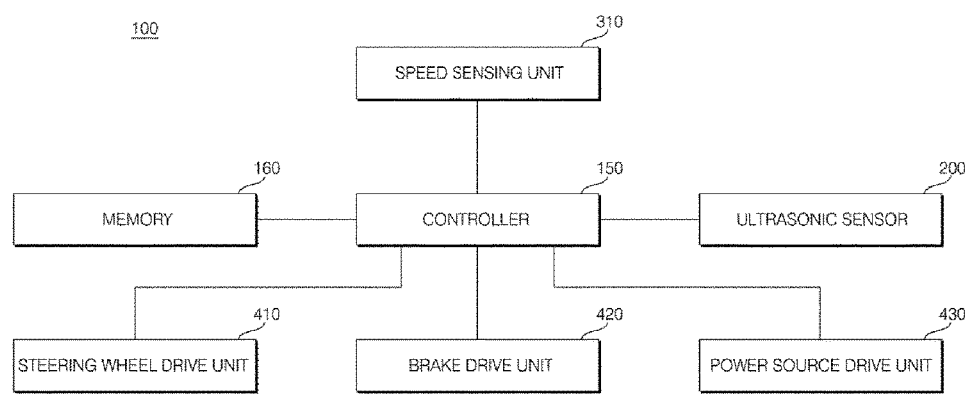
FIG. 6 is a block diagram illustrating an example of a parking assistance apparatus.

FIG. 6 is a block diagram illustrating an example of a parking assistance apparatus.

Referring to FIG. 6, the parking assistance apparatus 100 according to some implementations includes an ultrasonic sensor 200, a speed sensing unit 310, a memory 160, a steering wheel drive unit 410, a brake drive unit 420, a power source drive unit 430, a transmission drive unit (not illustrated), and a controller 150 to control the respective units of the parking assistance apparatus.

The ultrasonic sensor 200 may be the ultrasonic sensor 200 according to the first, second, and/or third implementations, as described above.

The speed sensing unit 310 senses a traveling speed during traveling of the vehicle 10.

The speed sensing unit 310 is configured to sense revolutions per minute of wheels of the vehicle 10, or to calculate the current speed of the vehicle by sensing revolutions per minute of an output shaft of a transmission connected to a vehicle engine. The speed sensing unit 310 may include, for example, a speed sensor to sense the revolutions per minute and a processor to calculate the current speed of the vehicle. The speed sensing unit 310 outputs the sensed speed value of the vehicle to the controller 150.

The memory 160 stores various programs, control commands, and data. The controller 150 may store data in the memory 160, or call the programs, commands, or data stored in the memory 160. The memory 160 stores information regarding the full width and the full length of a vehicle body configuring the external appearance of the vehicle 10. In some implementations, the full width means the widest horizontal width of the vehicle body in the transverse direction. The full length means a horizontal length from the front end to the rear end of the vehicle body.

The steering wheel drive unit 410 provides drive power to a steering wheel upon receiving a control signal from the controller 150, the steering wheel serving to steer the vehicle 10 by controlling a plurality of wheels.

The brake drive unit 420 controls an operation of a brake connected to wheels upon receiving a control signal from the controller 150. In some implementations, the brake drive unit 420 may directly reduce rotation of an engine of the vehicle 10, or operate a speed reduction device such as a retarder. The brake drive unit 420 may control a brake to reduce the speed of the vehicle 10 or stop the vehicle 10.

The power source drive unit 430 controls a power source of the vehicle 10 upon receiving a control signal from the controller 150. The power source drive unit 430 may control a power source of the vehicle 10 to provide power to the vehicle 10 for acceleration. For example, the power source may be an engine or a motor.

The transmission drive unit (not illustrated) controls forward or backward movement of the vehicle 10 upon receiving a control signal from the controller 150.

The controller 150 may sense an object based on a signal received from the ultrasonic sensor 200. More specifically, the controller 150 may sense an object located in a near field based on the third frequency. In addition, the controller 1500 may sense an object located in a far field based on the fourth frequency.

The controller 150 outputs a control signal to the steering wheel drive unit 410 so as to control the steering wheel based on whether or not an object is sensed. For example, when an object is sensed around the vehicle 10 during parking, the controller 150 may output a control signal to the steering wheel drive unit 410 such that the steering wheel can steer the vehicle 10 in the direction where no object is present.

The controller 150 outputs a control signal to the brake drive unit 420 so as to control a brake based on whether or not an object is sensed. For example, when an object is sensed around the vehicle 10 during parking, the controller 150 may output a control signal to the brake drive unit 420 so as to reduce the speed of the vehicle 10 or stop the vehicle 10.

The controller 150 outputs a control signal to the power source drive unit 430 so as to control a power source based on whether or not an object is sensed. For example, when no object is sensed around the vehicle 10 during parking, the controller 150 may output a control signal to the power source drive unit 430 so as to enable movement of the vehicle 10.

The controller 150 outputs a control signal to the transmission drive unit so as to control a transmission based on whether or not an object is sensed. For example, when an object is sensed behind the vehicle 10 while the vehicle is being parked via rearward movement, the controller 150 may output a control signal to the transmission drive unit so as to cause the vehicle 10 to move forward.

The controller 150 may determine an available parking space in which the vehicle 10 can be parked. For example, the ultrasonic sensor 200 according to some implementations may be installed to the right side of the vehicle 10. A parking lot may be located at the right side in the traveling direction of the vehicle 10 and a plurality of vehicles may be parked in the parking lot. The vehicle 10 travels while sensing an object (for example, the vehicles parked in the parking lot) through the ultrasonic sensor 200. At this time, the controller 150 may calculate the width or length of a space in which no object is detected based on a time during which an object is not continuously sensed and a traveling speed received from the speed sensing unit 310. At this time, the traveling speed may be an average speed for a time period during which no object is sensed.

The controller 150 may determine whether or not parking is possible by comparing the width or length of the space in which no object is sensed with the full width or full length of the vehicle body. Upon determining that parking is possible, the controller 150 may determine the space in which no object is sensed as an available parking space.

Examples of parking methods include horizontal parking (for example, parallel parking) and perpendicular parking (for example, forward movement parking, backward movement parking, and T-shaped parking). The controller 150 may determine a parking method based on a signal received from the ultrasonic sensor 200 according to the first, second, and/or third implementations described above.

For example, the controller 150 may determine whether an available parking space is a horizontal parking space or a perpendicular parking space by comparing the calculated width or length of the available parking space with the full width or full length of the vehicle body stored in the memory 160 as described above.

For example, the controller 180 may calculate the width or length of a sensed object based on a time during which an object is sensed (e.g., in a continuous manner) through the ultrasonic sensor 200 and a traveling speed of the vehicle 10 received from the speed sensing unit 310. For example the object may be a vehicle that is parked in a parking lot. In some implementations, the ultrasonic sensor 200 may be installed to the lateral side of the vehicle. The controller 150 may determine to which one of the full width and the full length of a parked vehicle the width or length of the sensed object corresponds. When the length of the object corresponds to the full width of the parked vehicle based on the determined result, the parking method corresponds to perpendicular parking. When the length of the object corresponds to the full length of the parked vehicle based on the determined result, the parking method corresponds to horizontal parking.

Figure 7:
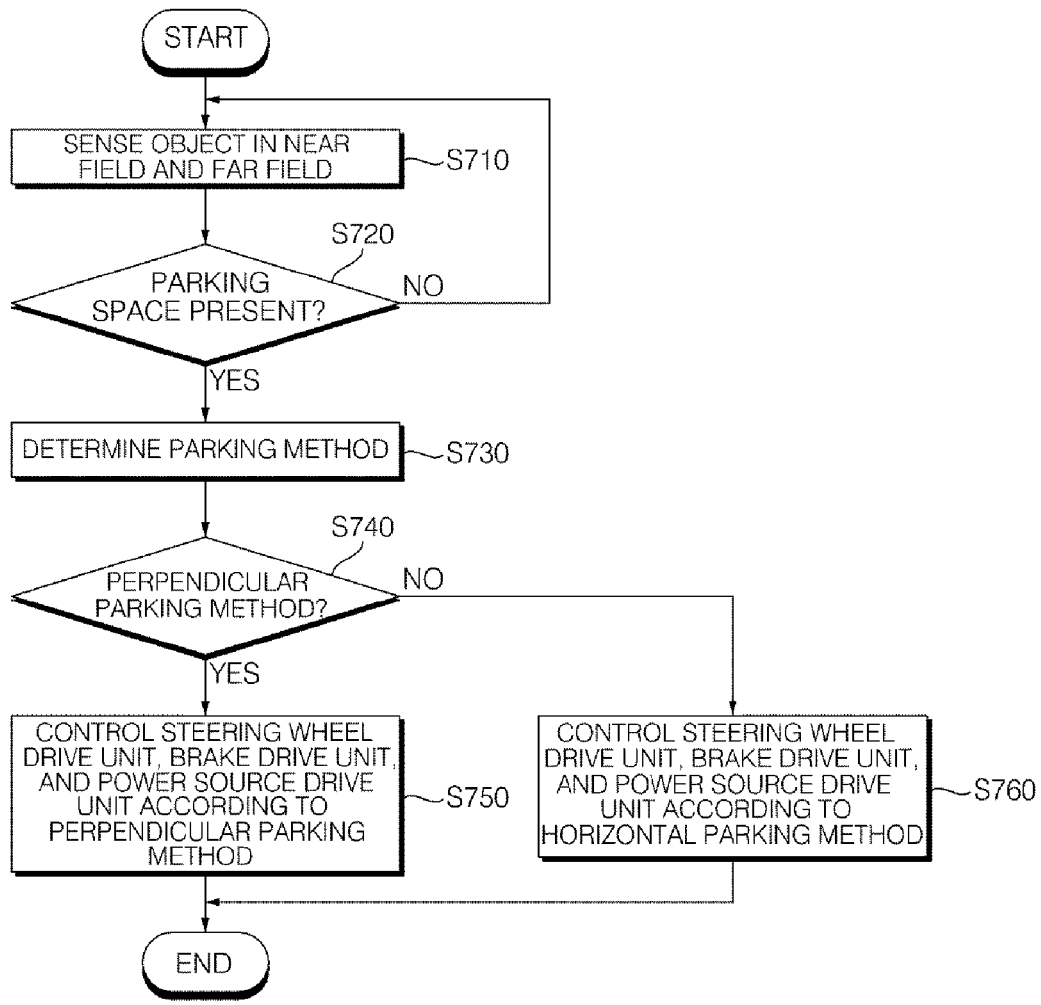
FIG. 7 is a flowchart illustrating an example of an operation of a parking assistance apparatus.

FIG. 7 is a flowchart illustrating an example of an operation of the parking assistance apparatus according to some implementations.

Referring to FIG. 7, the controller 150 senses objects located in a near field and a far field through the ultrasonic sensor 200 (S710). Specifically, the controller 150 may sense an object located in a near field based on the third frequency. In addition, the controller 150 may sense an object located in a far field based on the fourth frequency.

Based on whether or not an object is sensed, the controller 150 determines whether or not an available parking space is present (S720).

The ultrasonic sensor 200 according to some implementations may be installed to the lateral side of the vehicle 10. The vehicle 10 travels while sensing other vehicles parked in a parking lot through the ultrasonic sensor 200. At this time, the parking lot may be located in the direction facing the ultrasonic sensor 200. The controller 150 may calculate the width or length of a space in which no vehicle is detected based on a time during which an object is not continuously sensed and a traveling speed received from the speed sensing unit 310.

The controller 150 may determine whether or not parking is possible by comparing the width or length of the space in which no object is detected with the full width and full length of the vehicle 10 stored in the memory 160. Upon determining that parking is possible, the controller 150 may determine the space in which no object is detected as an available parking space.

Upon determining that the available parking space is present, the controller 150 determines a parking method (S730). The parking method may be horizontal parking (for example, parallel parking) or perpendicular parking (for example, forward movement parking, backward movement parking, or T-shaped parking). The controller 150 may determine a parking method based on a signal received from the ultrasonic sensor 200 according to the first, second, and/or third implementations described above.

For example, the controller 150, as described above, may determine whether the available parking possible space is a space suitable for horizontal parking or a space suitable for perpendicular parking by comparing the calculated width or length of the available parking space with the full width and the full length of the vehicle stored in the memory 160.

For example, the controller 150 may calculate the width or length of the sensed object based on a time during which an object is sensed (e.g., in a continuous manner) through the ultrasonic sensor 200 and a traveling speed of the vehicle 10 received from the speed sensing unit 310. At this time, the traveling speed may be an average traveling speed of the vehicle 10 for a time during which an object is sensed. For example, the object may be a vehicle that is parked in a parking lot. In some implementations, the ultrasonic sensor 200 may be located at the lateral side of the vehicle. The controller 150 may determine to which one of the full width and the full length of a parked vehicle the width or length of the sensed object corresponds. When the length of the object corresponds to the full width of the parked vehicle based on the determined result, the parking method corresponds to perpendicular parking. When the length of the object corresponds to the full length of the parked vehicle based on the determined result, the parking method corresponds to horizontal parking.

When the determined parking method is perpendicular parking (S740), the controller 150 performs a parking operation by transmitting a control signal corresponding to perpendicular parking to each of the steering wheel drive unit 410, the brake drive unit 420, and the power source drive unit 430 (S750).

When the determined parking method is not perpendicular parking, e.g., when the determined parking method is horizontal parking (S740), the controller 150 performs a parking operation by transmitting a control signal corresponding to horizontal parking to each of the steering wheel drive unit 410, the brake drive unit 420, and the power source drive unit 430 (S760).

FIGS. 8A to 9B are diagrams illustrating examples of a parking operation of a vehicle having a parking assistance apparatus.

FIGS. 8A to 8D are views referenced to illustrate a parking operation based on perpendicular parking according to some implementations.

Figure 8A:
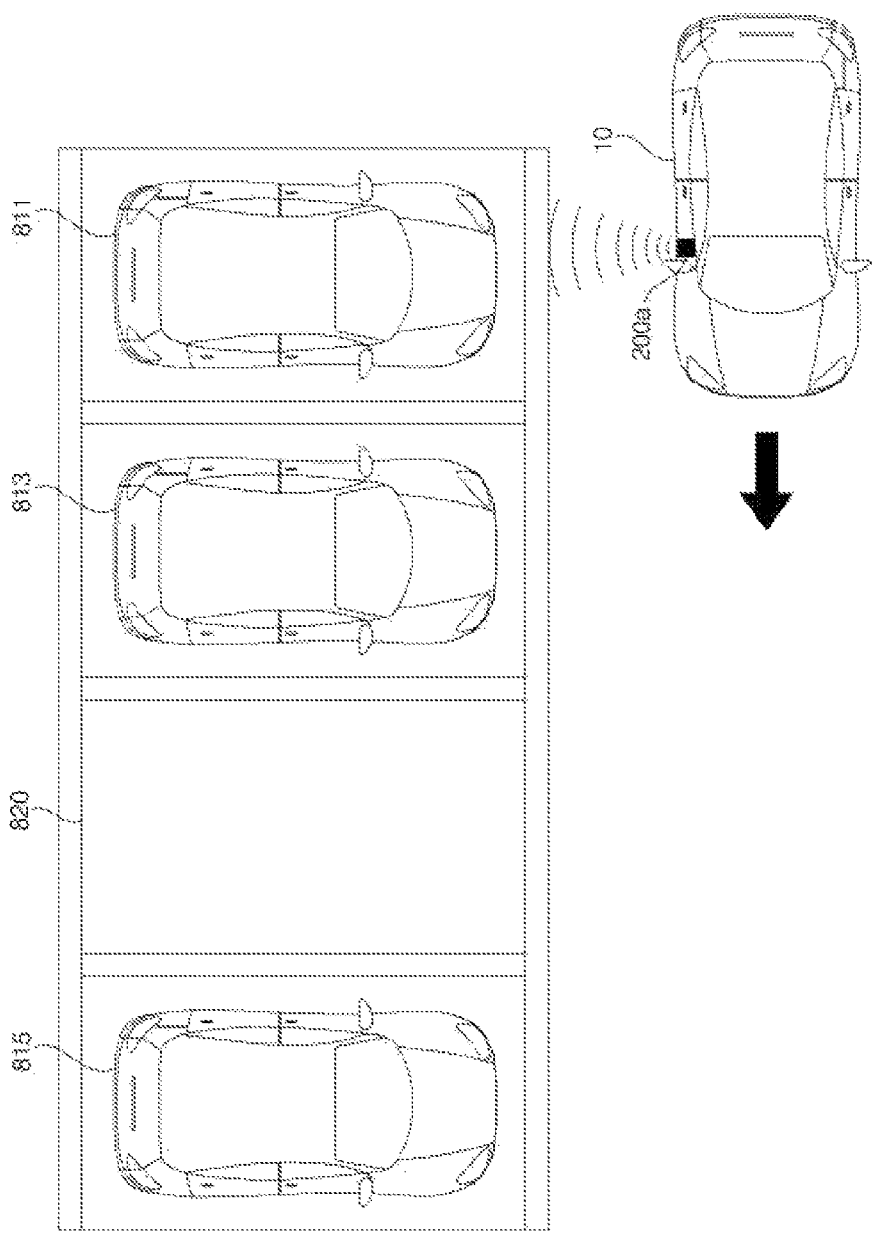
FIGS. 8A to 9B are diagrams illustrating examples of a parking operation of a vehicle having the parking assistance apparatus.

As illustrated in the example of FIG. 8A, the ultrasonic sensor 200a according to the first, second, and/or third implementations is installed to the right side of the vehicle 10 in the advancement direction of the vehicle 10. A parking lot is located at the right side in the advancement direction of the vehicle 10. The ultrasonic sensor 200a determines whether or not an object is present at the right side in the advancement direction of the vehicle 10. For example, the object may be other vehicles 811, 813 and 815 parked in the parking lot.

As described above, the ultrasonic sensor 200a detects the third frequency through the first filter 232 and the fourth frequency through the second filter 234 from echo ultrasonic waves that are synthesized ultrasonic waves reflected by the object.

When the vehicle 10 passes the first other vehicle 811 and the second other vehicle 813, the ultrasonic sensor 200a transmits ultrasonic waves to the first other vehicle 811 and the second other vehicle 813 and receives reflected echo ultrasonic waves. At this time, the controller 150 may sense the presence of the first other vehicle 811 and the second other vehicle 813 through the third frequency detected by the first filter 232 because the first other vehicle 811 and the second other vehicle 813 are located in a near field. For example, the controller 150 may determine that no parking space is present in a region where the first other vehicle 811 and the second other vehicle 813 are located.

Figure 8B:
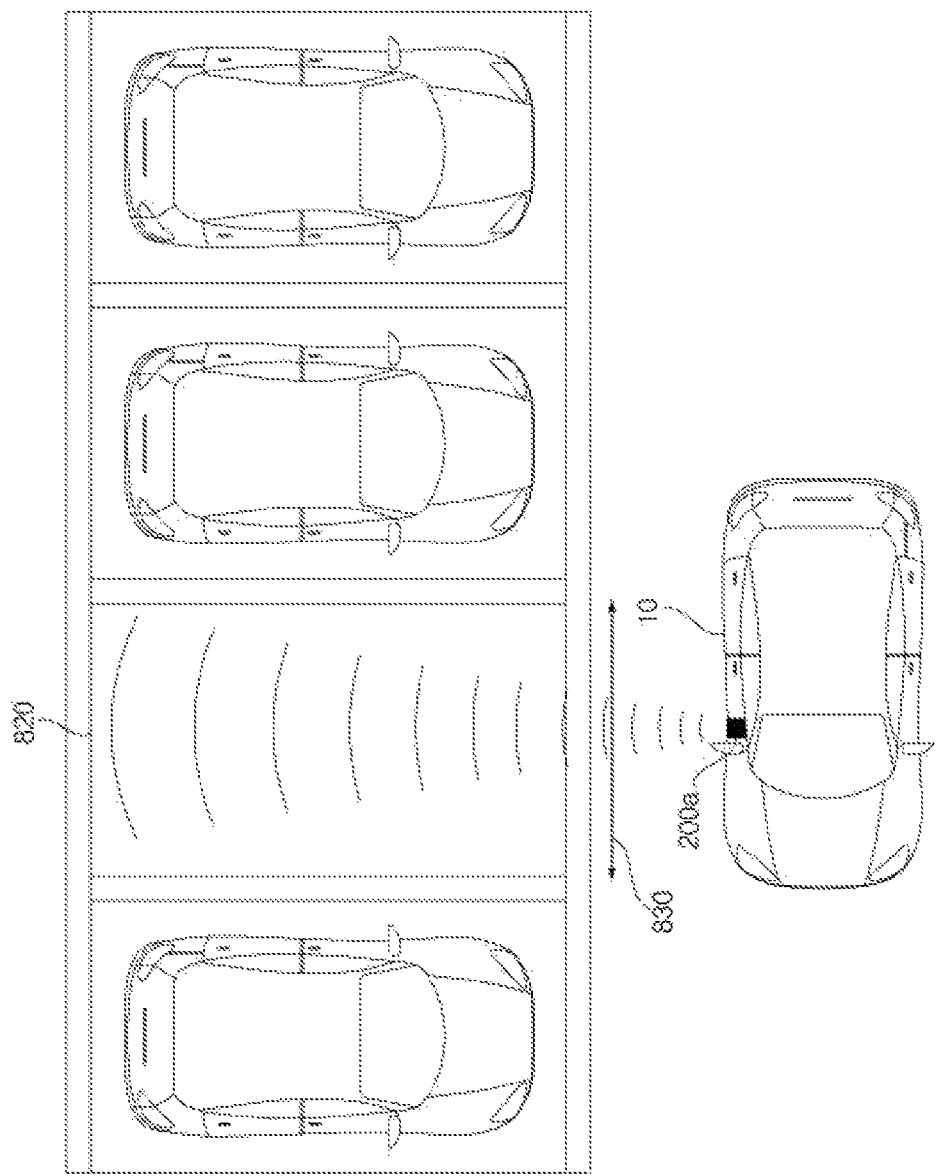

As illustrated in FIG. 8B, when the vehicle 10 moves forward and passes an empty parking space 820, the ultrasonic sensor 200a transmits ultrasonic waves to the empty parking space 820. For example, the ultrasonic sensor 200a cannot receive echo ultrasonic waves because no object is located in the empty parking space 820. Thus, the controller 150 may determine that no object is located in the empty parking space 820 in a near field and a far field.

During forward movement of the vehicle 10, the controller 150 may calculate the width of the space in which no object is sensed based on a time during which an object is not continuously sensed in the empty parking space 820 and a traveling speed received from the speed sensing unit 310.

The controller 150 determines whether parking is possible in the empty parking space 820 by comparing the calculated width 830 of the space with the full width of the vehicle body. Upon determining that parking is possible, the controller 150 determines the empty parking space 820 as an available parking space and performs a parking operation.

Thereafter, the controller 150 determines whether a parking method suitable for the available parking space is perpendicular parking or horizontal parking. The controller 150 may determine a parking method by comparing the calculated width 830 of the space with the full width or the full length of the vehicle. In some implementations, the parking method may be determined as perpendicular parking because the calculated width 830 of the space is greater than the full width and less than the full length.

Figure 8C:
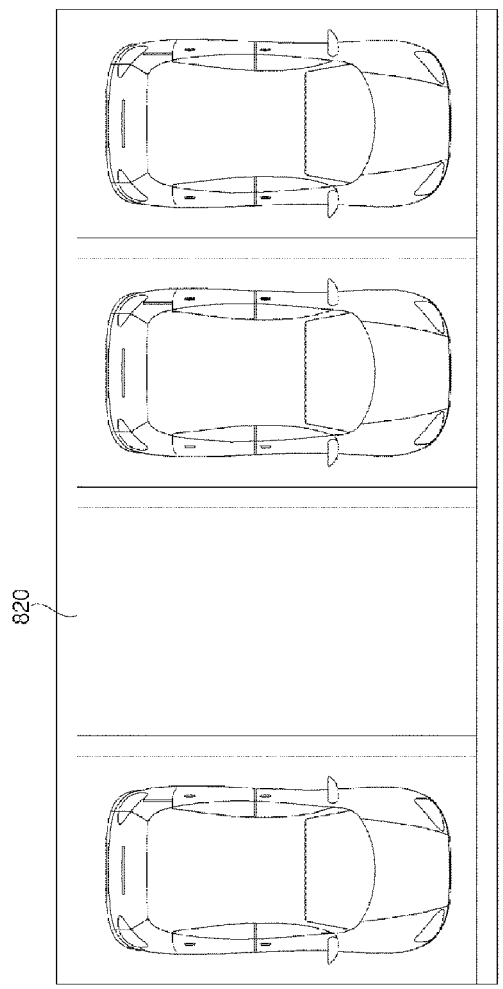
Figure 8C:
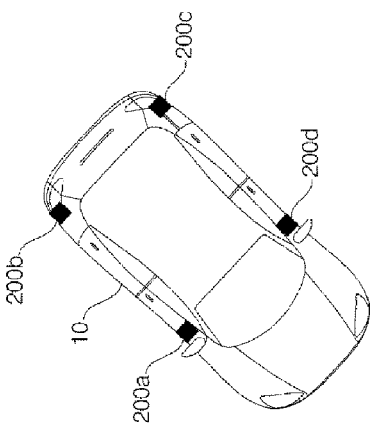
Figure 8D:
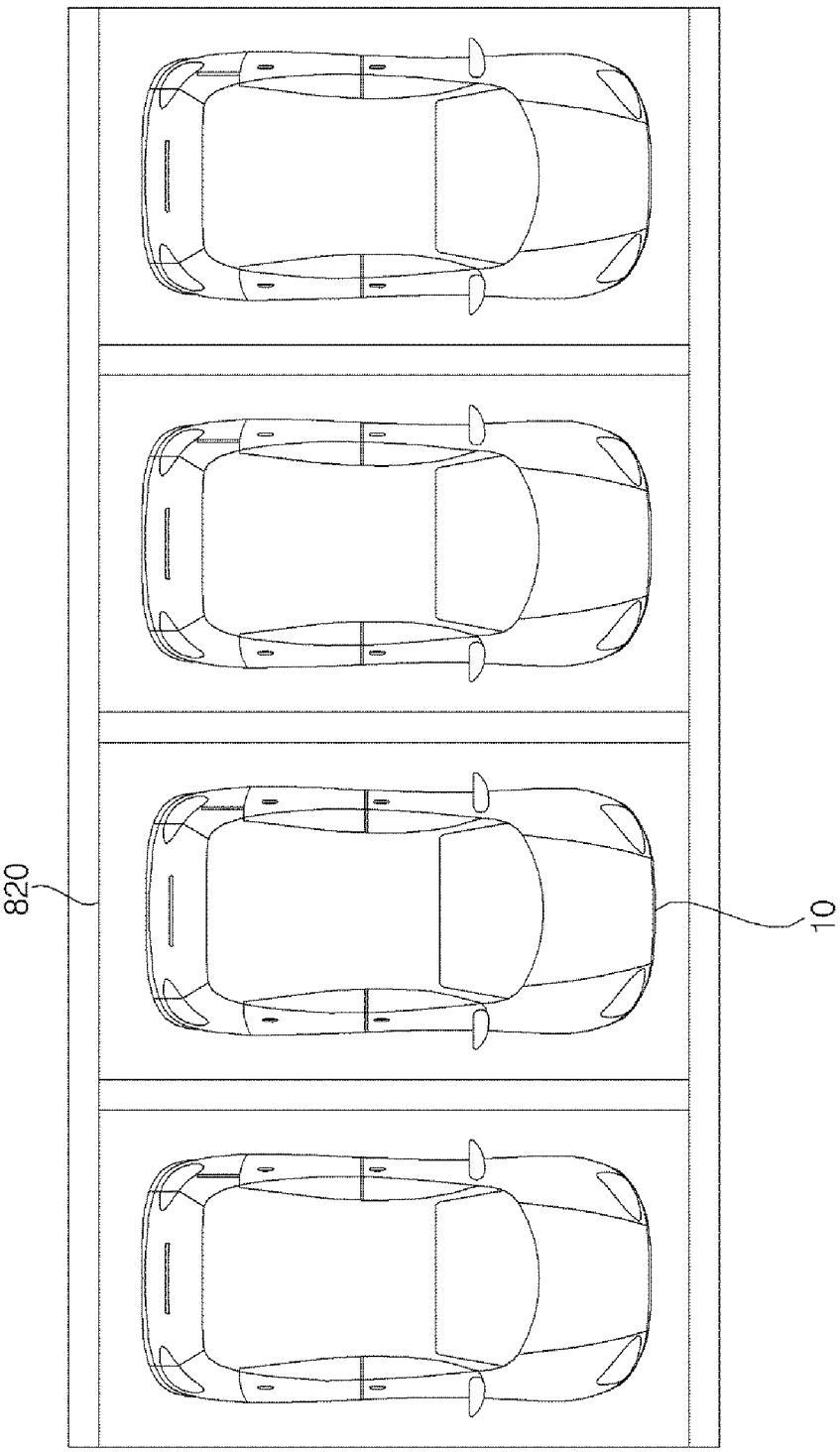

As illustrated in FIGS. 8C and 8D, when the available parking space and the parking method are determined, the controller 150 transmits a control signal corresponding to perpendicular parking to the steering wheel drive unit 410, the brake drive unit 420, and the power source drive unit 430 to perform a parking operation.

At this time, the controller 150 performs a parking operation by sensing (e.g., in a continuous manner) the presence of a near object via the ultrasonic sensors 200a, 200b, 200c and 200d equipped in the vehicle 10 and organically transmitting control signals corresponding to the sensed signals to the steering wheel drive unit 410, the brake drive unit 420 and the power source drive unit 430.

Figure 9A:
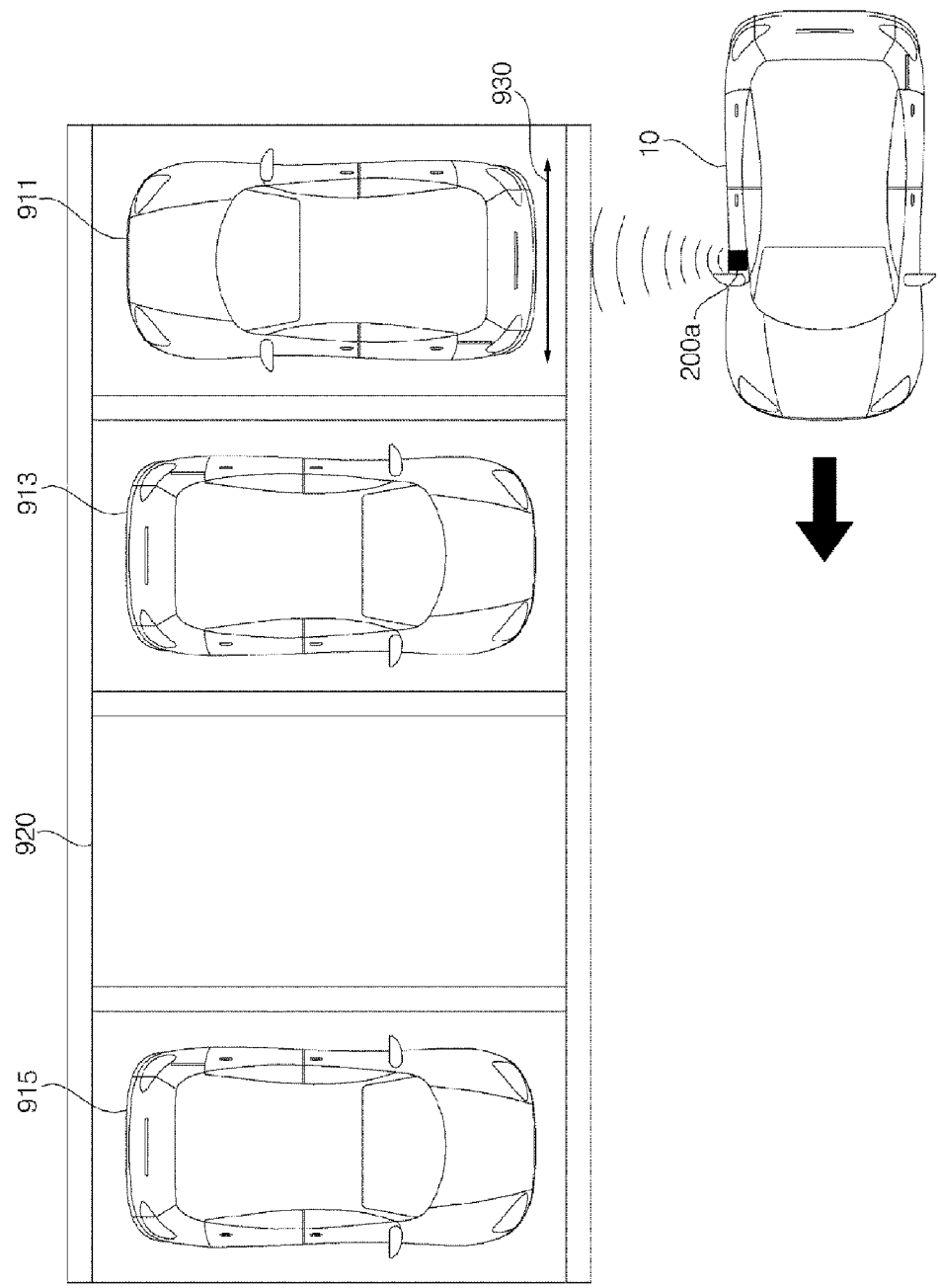
Figure 9B:
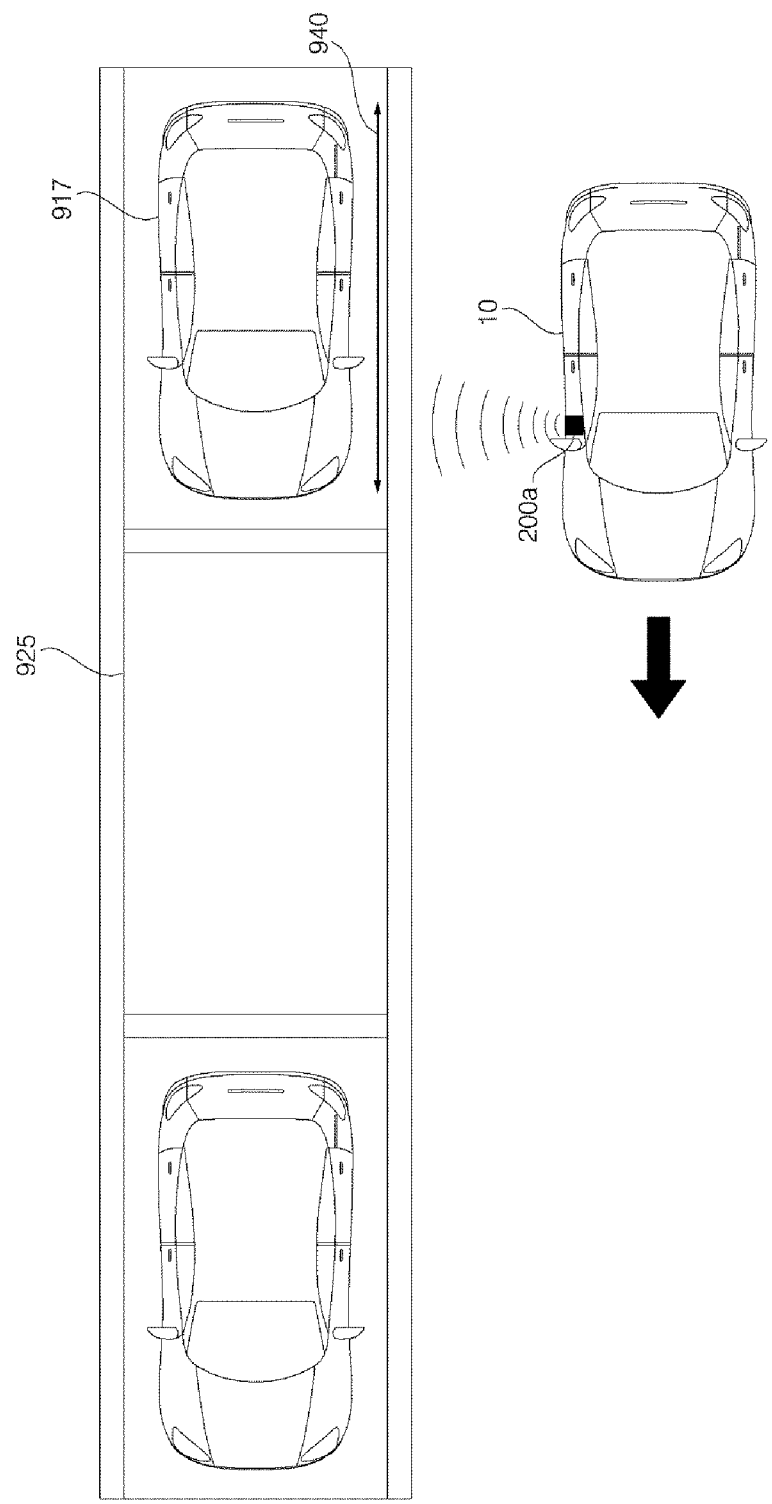

FIGS. 9A and 9B are diagrams illustrating an example of an operation for determining a parking method according to some implementations.

As illustrated in the example of FIG. 9A, the ultrasonic sensor 200a according to the first, second, and/or third implementations is installed to the right side of the vehicle 10 in the advancement direction of the vehicle 10. A parking lot is located at the right side in the advancement direction of the vehicle 10. The ultrasonic sensor 200a determines whether or not an object is present at the right side in the advancement direction of the vehicle 10. For example, the object is other vehicles 911, 913 and 915 parked in a parking lot.

The controller 150 may calculate a length 930 of a sensed object 911 based on a time during which the object 911 is sensed (e.g., in a continuous manner) through the ultrasonic sensor 200a and a traveling speed of the vehicle 10 received from the speed sensing unit 310.

The controller 150 may determine which one of the full width and the full length of the vehicle 10 is close to the length 930 of the object 911. For example, the controller 150 may determine whether the calculated length 930 of the object 910 corresponds to the full width or the full length of the vehicle 10 by comparing the calculated length 930 of the object 910 with the full width and the full length of the vehicle because a general vehicle has a full width of about 2 m and a full length of 4~5 m. For example, when the measured length 930 of the object 911 is 1.8 m, this corresponds to the full width of the vehicle 10.

Upon determining that the length 930 of the object 911 is close to the full width of the vehicle 10, the controller 150 determines a parking method as perpendicular parking.

As illustrated in FIG. 9B, the controller 150 may calculate a length 940 of a sensed object 917 based on a time during which the object 917 is sensed (e.g., in a continuous manner) through the ultrasonic sensor 200a and a traveling speed of the vehicle 10 received from the speed sensing unit 310.

The controller 150 may determine which one of the full width and the full length of the vehicle 10 is close to the length 940 of the object 917. For example, when the measured length 940 of the object 917 is 4 m, this corresponds to the full length of the vehicle 10.

Upon determining that the length 940 of the object 917 is close to the full length of the vehicle 10, the controller 150 determines a parking method as horizontal parking.

In the respective implementations as described above, it is noted that the controller is controlled by an electronic control unit (ECU) equipped in the vehicle.

In some scenarios, at least some implementations may have various effects as follows.

First, there is an effect of detecting obstacles located in a near field and a far field through a filtered frequency by transmitting an ultrasonic signal of a synthesized frequency and receiving resulting echo ultrasonic waves.

Second, there is an effect of detecting whether an obstacle is present in a parking area even in the case of perpendicular parking since a parking assistance apparatus is capable of using ultrasonic waves that enable detection up to a far field.

Third, there is an effect of replacing a high price radar sensor with a low price ultrasonic sensor.

Effects of some implementations are not necessarily limited to the aforementioned effects, and other not-mentioned effects may result from the implementations.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A parking assistance apparatus comprising:
    a frequency generator configured to:
        generate a first frequency and a second frequency; and
        generate at least one synthesized frequency that is synthesized from the first frequency and the second frequency;
    a piezoelectric converter configured to, using piezoelectric effects:
        transmit ultrasonic waves having the at least one synthesized frequency; and
        receive reflected ultrasonic waves that result from the transmitted ultrasonic waves being reflected by an object; and
    a filter unit configured to detect a predetermined frequency from the reflected ultrasonic waves,
    wherein the at least one synthesized frequency comprises a third frequency and a fourth frequency, and
    the filter unit comprises:
        a first filter configured to detect the third frequency from the reflected ultrasonic waves; and
        a second filter configured to detect the fourth frequency from the reflected ultrasonic waves,
    the parking assistance apparatus further configured to:
        detect an object in a near field based on the detected third frequency; and
        detect an object in a far field based on the detected fourth frequency.

2. The parking assistance apparatus according to claim 1, wherein the piezoelectric converter is configured to transmit the ultrasonic waves and to receive the reflected ultrasonic waves based on time sharing between a transmission state and a reception state.

3. The parking assistance apparatus according to claim 1, wherein the filter unit includes a band pass filter.

4. The parking assistance apparatus according to claim 1, further comprising a diffuser configured to diffuse the ultrasonic waves over at least a predetermined range of diffusion.

5. A vehicle comprising the parking assistance apparatus according to claim 1.

6. A parking assistance apparatus comprising:
    a frequency generator configured to:
        generate a first frequency and a second frequency; and
        generate at least one synthesized frequency that is synthesized from the first frequency and the second frequency;
    a piezoelectric converter configured to, using piezoelectric effects, transmit ultrasonic waves having the at least one synthesized frequency;
    a microphone configured to receive reflected ultrasonic waves that result from the transmitted ultrasonic waves being reflected by an object; and
    a filter unit configured to detect a predetermined frequency from the reflected ultrasonic waves,
    wherein the at least one synthesized frequency comprises a third frequency and a fourth frequency, and
    the filter unit comprises:
        a first filter configured to detect the third frequency from the reflected ultrasonic waves; and
        a second filter configured to detect the fourth frequency from the reflected ultrasonic waves,
    the parking assistance apparatus further configured to:
        detect an object in a near field based on the detected third frequency; and
        detect an object in a far field based on the detected fourth frequency.

7. The parking assistance apparatus according to claim 6, wherein the filter unit includes a band pass filter.

8. The parking assistance apparatus according to claim 6, further comprising a diffuser configured to diffuse the ultrasonic waves over at least a predetermined range of diffusion.

9. The parking assistance apparatus according to claim 6, further comprising:
    a steering wheel drive unit configured to change a travelling direction of a vehicle by moving at least one wheel of the vehicle; and
    a controller configured to:
        determine whether or not an object is sensed based on the detected third frequency and the detected fourth frequency during a parking operation of the vehicle; and
        control the steering wheel drive unit based on a determination of whether or not the object is sensed.

10. A vehicle comprising the parking assistance apparatus according to claim 9.

11. The parking assistance apparatus according to claim 6, further comprising:
    a brake drive unit configured to control operation of a brake connected to at least one wheel of the vehicle;
    a power source drive unit configured to control operation of a power source of the vehicle; and
    a controller configured to:
        determine whether or not an object is sensed based on the third frequency and the fourth frequency during a parking operation of the vehicle; and
        control the brake drive unit and the power source drive unit of the vehicle based on a determination of whether or not the object is sensed.

12. A vehicle comprising the parking assistance apparatus according to claim 11.

13. The parking assistance apparatus according to claim 6, further comprising:
    a speed sensing unit configured to sense a traveling speed of a vehicle; and
    a controller configured to:
        determine whether or not an object is sensed based on the third frequency and the fourth frequency; and
        determine an available parking space based on a period of time during which the object is not sensed and based on the traveling speed of the vehicle sensed by the speed sensing unit.

14. The parking assistance apparatus according to claim 13, further comprising a memory configured to store information regarding a width and a length of a body of the vehicle,
    wherein the controller is further configured to:
        determine a width and a length of the available parking space;
        perform a first comparison between the width of the body of the vehicle and the width of the available parking space;
        perform a second comparison between the length of the body of the vehicle and the length of the available parking space; and
        determine a parking method for the vehicle based on the first comparison and the second comparison.

15. The parking assistance apparatus according to claim 13, wherein the controller is configured to:
    determine a physical dimension of the sensed object based on a period of time during which the object is sensed and based on the traveling speed of the vehicle sensed by the speed sensing unit; and determine a parking method of the vehicle based on the determined physical dimension of the sensed object.

16. A vehicle comprising the parking assistance apparatus according to claim 14.

17. A vehicle comprising the parking assistance apparatus according to claim 13.

18. A vehicle comprising the parking assistance apparatus according to claim 6.

19. A vehicle comprising the parking assistance apparatus according to claim 6.

\* \* \* \* \*